United States Patent
Chen et al.

(10) Patent No.: US 7,362,009 B2
(45) Date of Patent: Apr. 22, 2008

(54) CHAIN REACTION CONTROL CIRCUIT FOR PARALLEL POWER SUPPLY

(75) Inventors: Tsung-Chun Chen, Hsin-Tien (TW); Tsung-Te Lee, Hsin-Tien (TW)

(73) Assignee: Zippy Technology Corp., Taipei Hsien (TW)

( * ) Notice: Subject to any disclaimer, the term of this patent is extended or adjusted under 35 U.S.C. 154(b) by 560 days.

(21) Appl. No.: 10/840,219

(22) Filed: May 7, 2004

(65) Prior Publication Data
US 2005/0248889 A1 Nov. 10, 2005

(51) Int. Cl.
*H02J 1/10* (2006.01)
*H02J 3/46* (2006.01)
(52) U.S. Cl. .......................................... 307/87; 307/80
(58) Field of Classification Search .................. 307/81, 307/86, 65, 80, 29, 55, 62, 87; 713/330
See application file for complete search history.

(56) References Cited

U.S. PATENT DOCUMENTS

| | | | |
|---|---|---|---|
| 3,755,686 A * | 8/1973 | Woods .......................... | 307/18 |
| 5,552,643 A * | 9/1996 | Morgan et al. ................. | 307/81 |
| 6,034,443 A * | 3/2000 | Oliemuller et al. ........... | 307/70 |
| 6,144,115 A * | 11/2000 | Massie et al. ................. | 307/80 |
| 6,329,726 B1 * | 12/2001 | Lau et al. ....................... | 307/58 |
| 6,597,074 B2 * | 7/2003 | Tsujikado et al. ............. | 307/66 |
| 7,114,084 B2 * | 9/2006 | Cioaca ........................ | 713/300 |

FOREIGN PATENT DOCUMENTS

TW 00566760 12/2003

* cited by examiner

*Primary Examiner*—Michael Sherry
*Assistant Examiner*—Andrew M. Deschere
(74) *Attorney, Agent, or Firm*—Birch, Stewart, Kolasch & Birch, LLP

(57) ABSTRACT

A chain reaction control circuit for parallel power supply provides greater power without changing the design of the original power supply structure. It includes a control unit to receive a first power actuation signal output from a power actuation unit, then output multiple sets of second power actuation signals to parallel power supplies. The multiple power supplies that are coupled in parallel receive the second power actuation signals and transform electric power simultaneously, then output electric power. After the electric power transformation has been finished, first power confirmation signals are output from the power supplies to the control unit which receives the first power confirmation signals and outputs a second power confirmation signal to a linked load. And the power supplies supply the corresponding and matching electric power to a linked load.

5 Claims, 5 Drawing Sheets

CHAIN REACTION CONTROL CIRCUIT FOR PARALLEL POWER SUPPLY

FIELD OF THE INVENTION

The present invention relates to a chain reaction control circuit for parallel power supply and particularly to a control circuit adopted for use on a plurality of parallel power supplies of same or different power specifications to simultaneously activate electric power transformation to output electric power.

BACKGROUND OF THE INVENTION

With flourishing developments of multimedia technologies, many personal computers or servers are equipped with more hardware equipment (such as hard disk drive, card reader, compact disc burner and the like) to improve performance. Due to the power supply for the original hardware configuration has a fixed power capacity, when the added hardware equipment exceed the original power supply limitation, users have to procure a power supply of a greater capacity to meet the operation requirement. For the power supply vendors, trying to meet the requirement of a greater power supply capacity through a single power supply involves complicated techniques. It results in higher manufacturing cost. The size and heat dissipation problems also are difficult to overcome. Moreover, in the event that all of the hardware equipment is not being fully utilized during computer operation, electric power resource is wasted.

In view of these concerns, some vendors have adopted an approach that couples a plurality of power supplies in a parallel fashion. And a plurality of electric output connectors are provided to complement the higher and the lower power at the same time. FIG. 1 illustrates a technique disclosed in R.O.C. patent publication No. 00566760, entitled "Improved high capacity power supply". It provides a high capacity power supply by coupling power supplies in a parallel fashion. It has output of +5V −5V and +3.3V. Another power supply has output of +12V and −12V. The individual power supply is controlled by a driving circuit. Then the power supplies are configured on a same base board in a parallel fashion through a pulse wave control circuit and a protection circuit. Such a structure has drawbacks, notably:

1. The internal circuit of each power supply has to be modified significantly. The power supply of different vendors has compatibility problem. This incompatibility problem even occurs to the power supply of different models purchased at different time. Hence once a power supply breaks down, the entire set of the parallel power supply has to be replaced. It is not economical.

2. In the event that two sets of power supply coupled in parallel fashion still cannot meet the hardware requirement, due to circuit design, it is not possible to add another power supply in the parallel fashion. Hence the expandability is limited. Even if the internal circuit of the individual power supply has been redesigned, the incurred cost is great. Moreover, for each additional power supply, one more control IC has to be added. The resulting cost increase is significant.

3. The power supply has to be coupled in parallel under the same power specification. It limits the coupled power capacity. To couple with a lower capacity power supply in parallel will result in not meeting the requirement of high power capacity. But to couple with a higher capacity power supply in parallel, the hardware equipment will result in waste of electric power resource when in use.

SUMMARY OF THE INVENTION

Therefore the primary object of the present invention is to resolve the aforesaid disadvantages. The invention aims to provide a high capacity power supply structure without altering the design of the original power supply. A control unit is provided to perform signal distributing function. The number of signal output legs correspond to the parallel number of the power supply, and the power supply may be coupled under the same or different power specifications multiple sets may be coupled in parallel according to the power requirement of hardware equipment. In the event that users change or reduce hardware equipment, a single power supply may function independently to provide a lower power output. Thus the invention can optimize the benefits of higher and lower power combinations at minimum designing and manufacturing costs.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
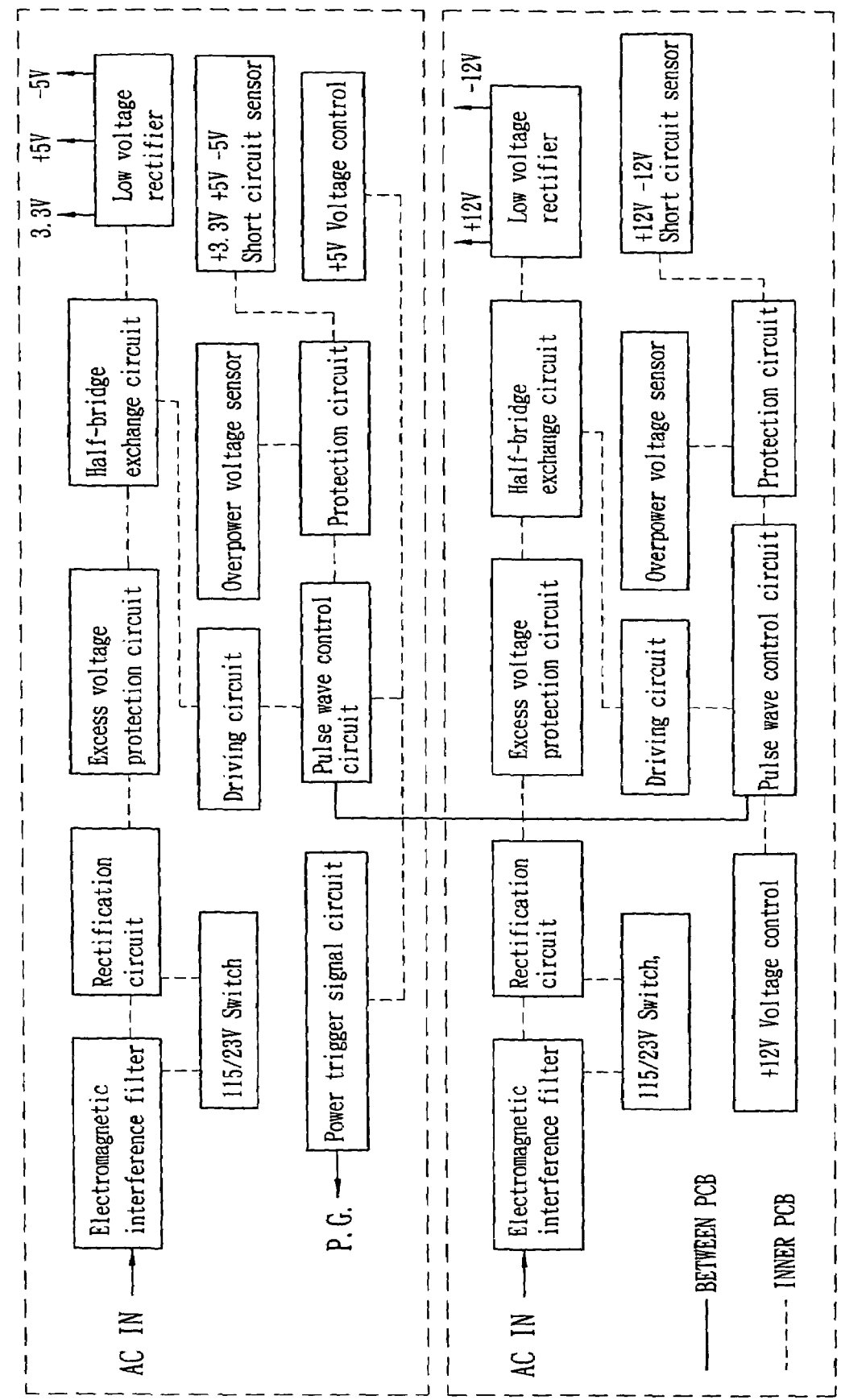
FIG. 1 is a circuit block diagram of a conventional parallel power supply.
Figure 2:
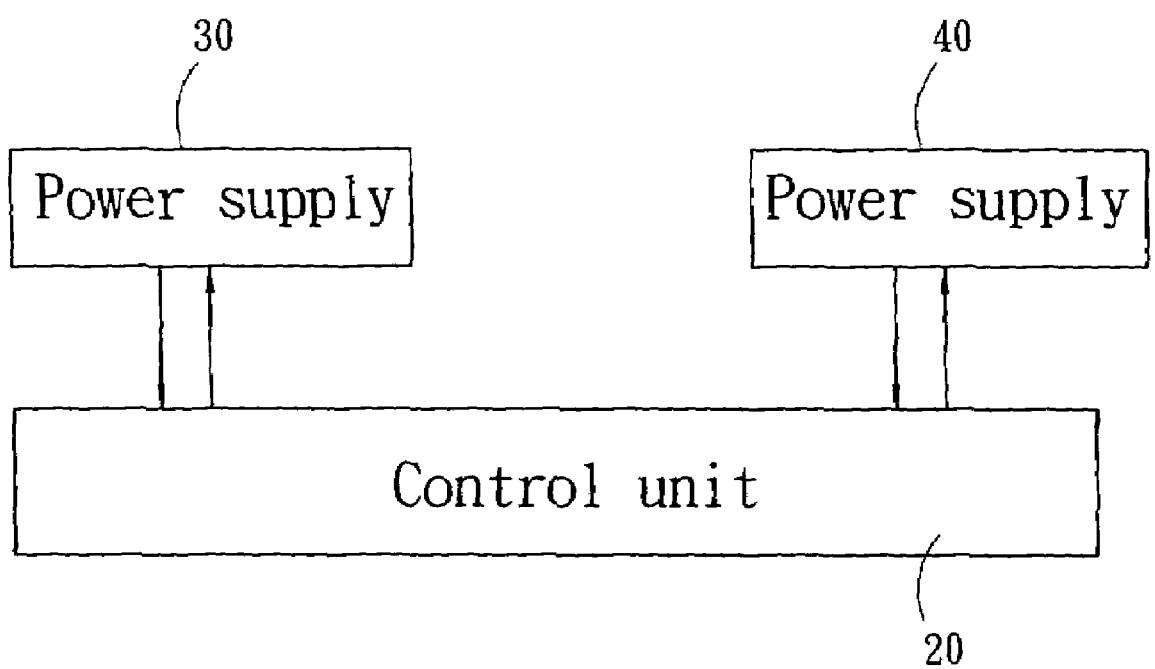
FIG. 2 is a block diagram of the invention in a coupled condition.
Figure 3:
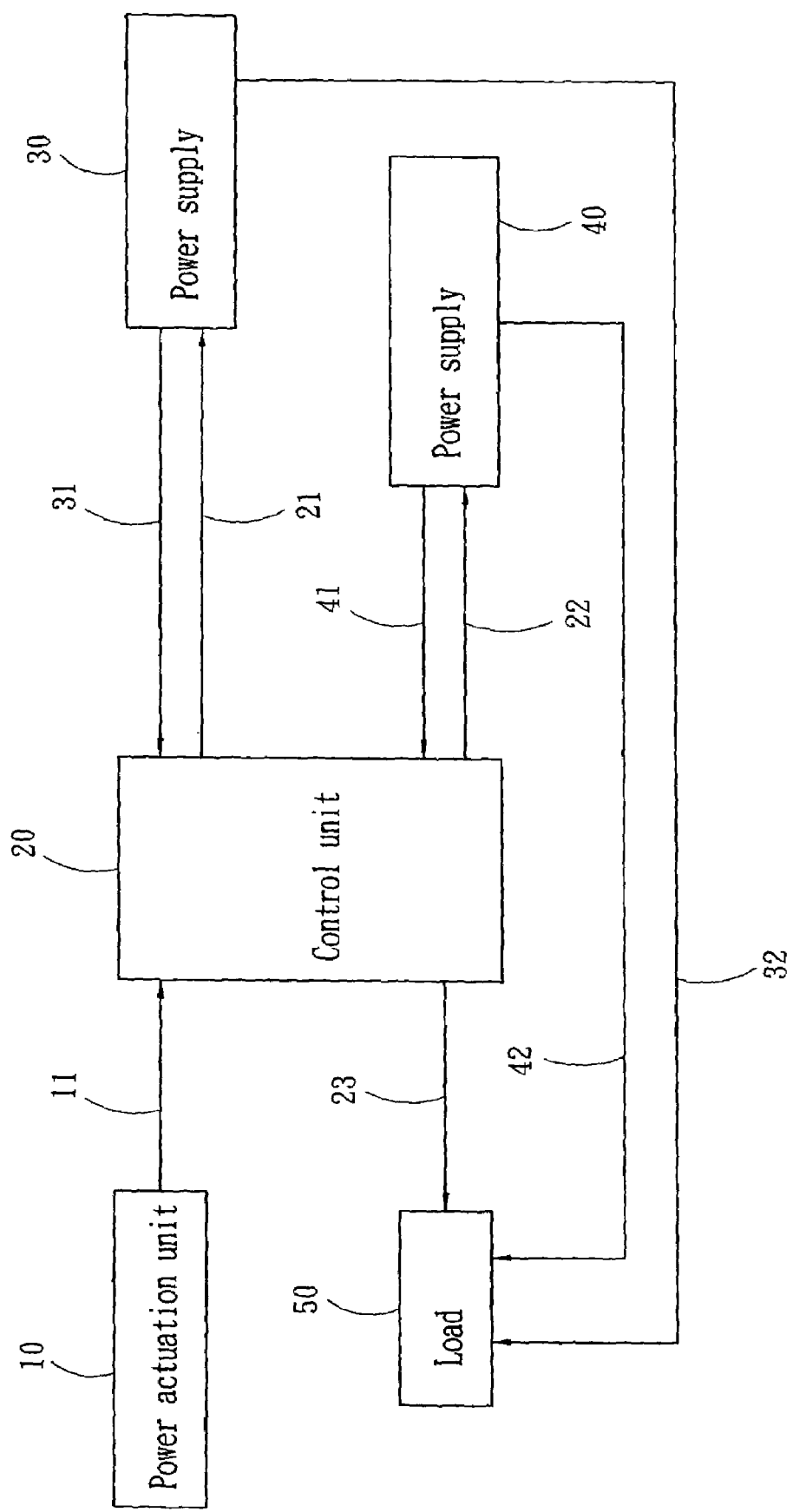
FIG. 3 is a circuit block diagram of the invention

Please refer to FIGS. 2 and 3 for the coupling and circuit block diagrams of the invention. The invention includes a chain reaction control circuit for parallel power supply 30 and 40. The chain reaction control circuit includes a power actuation unit 10 to output a first power actuation signal 11 to activate electric power output, a control unit 20 to receive the power actuation signal and output a plurality of second power actuation signals 21 and 22, and the parallel power supply 30 and 40 that receive the second power actuation signals 21 and 22 and perform electric power transformation to output electric power 32 and 42. The power supply 30 and 40 also output respectively a first power confirmation signal 31 and 41 to the control unit 20 when the transformation of the electric power 32 and 42 has finished, and the control unit 20 receives the first power confirmation signals 31 and 41 and outputs a second power confirmation signal 23 to a linked load 50, and the power supply 30 and 40 supply the corresponding and matching electric power 32 and 42 to the load 50.

Figure 4:
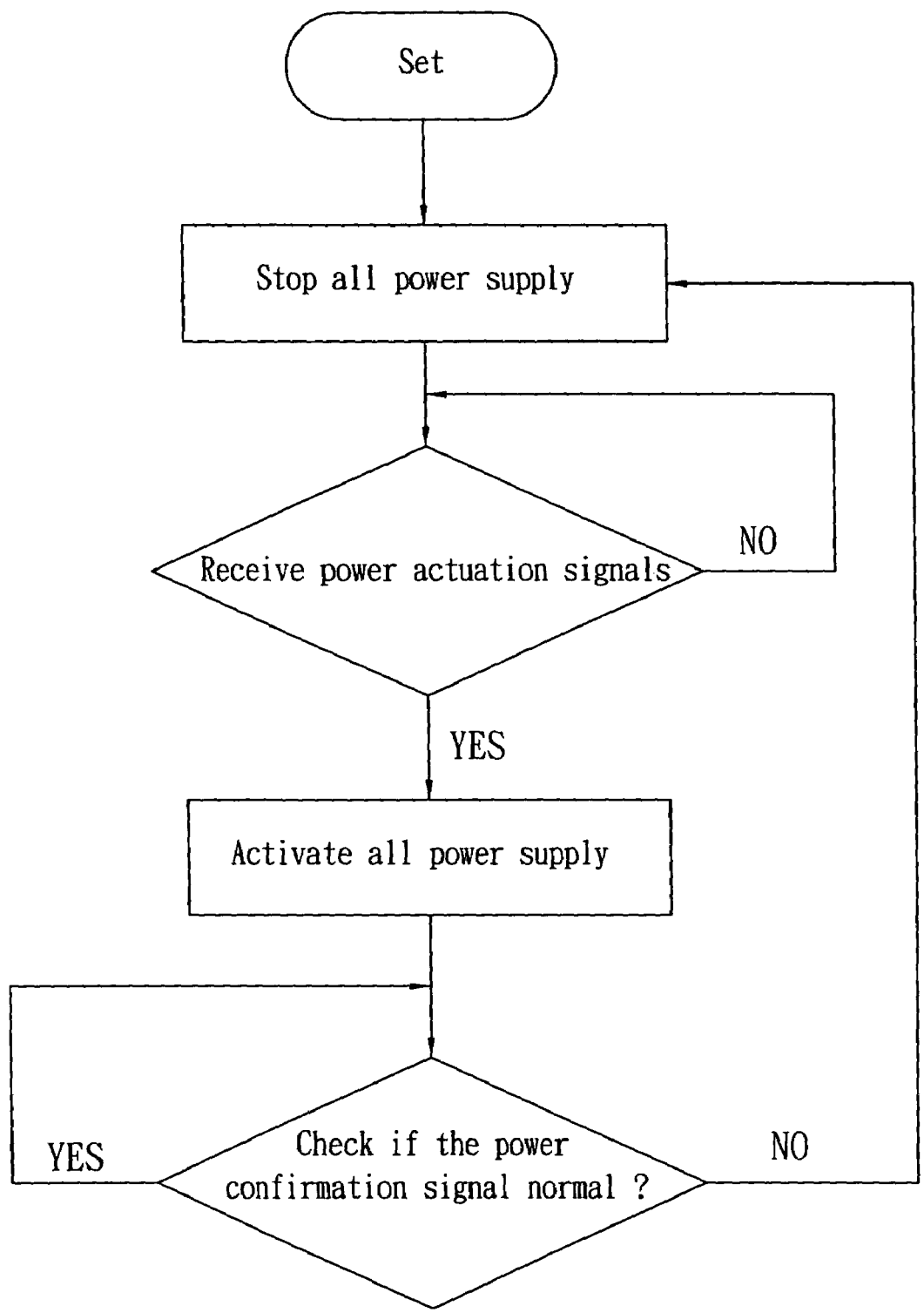
FIG. 4 is a signal flow chart of the invention.

Refer to FIGS. 3 and 4 for the circuit diagram and signal flow chart of the parallel power supply 30 and 40 of the invention. The signal operation process includes the following steps:

A. At the initial condition in which the parallel power supply 30 and 40 are connected to an external power source and to the control unit 20 with signal communication, the control unit 20 generates the second power actuation signals 21 and 22 to each power supply 30 and 40 to stop the operation of the power supply 30 and 40;

B. User activates the power actuation unit 10 (a power switch on a computer host system or starting device of other computer host systems). The power actuation unit 10 issues the first power actuation signal 11 to the control unit 20 and activates the external power source to output electric power, and goes to the next step. If the control unit 20 does not receive the first power actuation signal 11, the idle condition of step A is maintained;

C. After the control unit 20 has received the first power actuation signal 11, depending on the number of signal output legs, a plurality of the second power actuation signals 21 and 22 are output to the power supply 30 and 40. Meanwhile, the power supply 30 and 40 perform transformation process for the electric power 32 and 42. After the process of the electric power 32 and 42 has been finished, the first power confirmation signals 31 and 41 are sent to the control unit 20 which receives the first power confirmation signal 31 and 41, and outputs the second power confirmation signal 23 to the linked load 50; and D. In the event that the first power confirmation signal 31 and 41 are in normal conditions, the power supply 30 and 40 supply the transformed corresponding and matching electric power 32 and 42 to the load 50 (may be a load 50 or combinations of multiple loads 50). In the event that the first power confirmation signals 31 and 41 are abnormal, the control unit 20 issues the second power actuation signals 21 and 22 to the power supply 30 and 40 to stop output of the electric power 32 and 42; in the mean time cuts off transmission of the second power confirmation signal 23 to the load 50 to stop input of the electric power 32 and 42 to the load 50.

The process set forth above is the signal process for the power actuation unit 10 to activate input of an external electric power source. In the event that users want to shut down output of the electric power 32 and 42 of the power supply 30 and 40, at step B after the power actuation unit 10 has issued the first power actuation signal 11 to the control unit 20, the control unit 20 at step C sends the second power actuation signals 21 and 22 to various power supply 30 and 40 to stop output of the electric power 32 and 42.

In summary, the invention can achieve the following effects:

1. There is no need to change the internal circuit design of the power supply 30 and 40. Signal transformation process is performed through the control unit 20. In the event that any of the power supply 30 and 40 is damaged, all of the power supply 30 and 40 may be shut down through the control unit 20 when the first power confirmation signals 31 and 41 are detected. Thus the load 50 may be protected in abnormal conditions.

Figure 5:
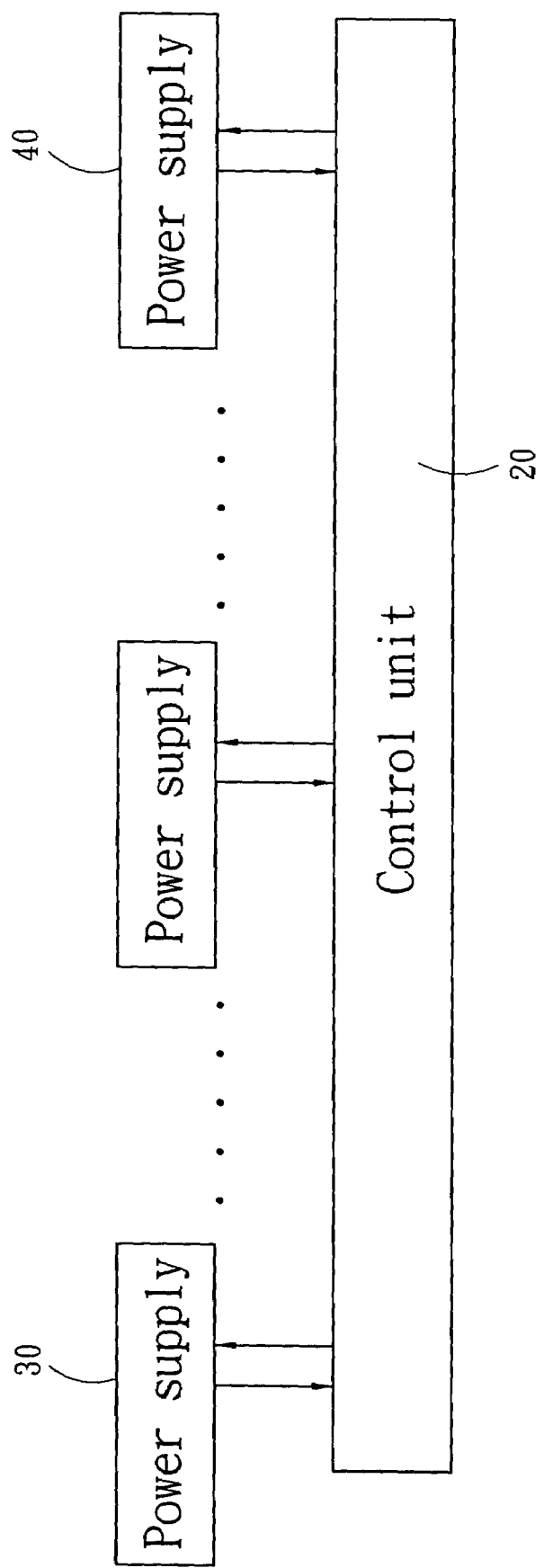
FIG. 5 is a block diagram of another embodiment of the invention in use.

2. In the event that the load 50 (hardware equipment) is expanded and one or more sets of power supply 30 and 40 have to be added, it may be set through the control unit 20 which is a driving IC. And the number of the signal output legs of the control unit 20 corresponds to the number of the parallel power supply 30 and 40. Referring to FIG. 5, multiple sets of power supply 30 and 40 may be coupled in a parallel fashion. The signal process is the same as the one previously discussed.

3. The power supply 30 and 40 to be coupled are not limited to the same power specification. Depending on user's requirements, the power required by different loads 50 may be coupled to form a high power combination. And this may be accomplished through a single power supply 30 or 40. Thus the invention can provide an improved expandability to achieve a greater economic effectiveness.

While the preferred embodiments of the invention have been set forth for the purpose of disclosure, modifications of the disclosed embodiments of the invention as well as other embodiments thereof may occur to those skilled in the art. Accordingly, the appended claims are tended to cover all embodiments which do not depart from the spirit and scope of the invention.

What is claimed is:

1. A chain reaction control circuit for parallel power supply, comprising:
   a power actuation unit to output a first power actuation signal to activate electric power output;
   a control unit to receive the first power actuation signal and output simultaneously a plurality of second power actuation signals; and
   a plurality of parallel power supplies which transform electric power to receive the second power actuation signals and transform electric power and output electric power;
   wherein the parallel power supplies output first power confirmation signals to the control unit after having finished the electric power transformation, the control unit receiving the first power confirmation signals and outputting a second power confirmation signal to a linked load, and the parallel power supplies supplying the electric power matching the corresponding load.

2. The chain reaction control circuit for parallel power supply of claim 1, wherein the power actuation unit is a power switch.

3. The chain reaction control circuit for parallel power supply of claim 1, wherein the control unit is a driving IC and has signal output legs at a number corresponding to the number of the parallel power supply.

4. The chain reaction control circuit for parallel power supply of claim 1, wherein the control unit outputs a number of second power actuation signals to expand the number of power supplies.

5. The chain reaction control circuit for parallel power supply of claim 1, wherein said control unit shuts down said power supplies in case of a damaged power supply.

* * * * *